United States Patent
Sriraghavan et al.

(10) Patent No.: US 8,401,168 B2
(45) Date of Patent: Mar. 19, 2013

(54) SYSTEM AND METHOD FOR RING DELAY ON A USER AGENT

(75) Inventors: Priyanka G. Sriraghavan, Tamil Nadu (IN); Lakshmi Nrusimhan N. V., Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 175 days.

(21) Appl. No.: 12/832,562

(22) Filed: Jul. 8, 2010

(65) Prior Publication Data

US 2012/0008761 A1 Jan. 12, 2012

(51) Int. Cl.
*H04M 5/00* (2006.01)
(52) U.S. Cl. ........... 379/252; 379/179; 379/373.01; 379/373.02; 379/373.03; 379/373.04
(58) Field of Classification Search ............ 379/221.09, 379/127.01, 211.02, 252, 376.02, 229, 199, 379/377, 157, 158, 177, 102.03, 567; 455/567
See application file for complete search history.

(56) References Cited

U.S. PATENT DOCUMENTS

| | | | | |
|---|---|---|---|---|
| 5,596,631 A | * | 1/1997 | Chen | 379/177 |
| 5,604,797 A | * | 2/1997 | Adcock | 379/376.02 |
| 5,926,537 A | * | 7/1999 | Birze | 379/252 |
| 5,930,346 A | * | 7/1999 | Chen | 379/211.02 |
| 6,252,954 B1 | * | 6/2001 | Malik | 379/221.09 |
| 6,295,346 B1 | * | 9/2001 | Markowitz et al. | 379/127.01 |
| 2010/0331055 A1 | * | 12/2010 | Lothrop et al. | 455/567 |

* cited by examiner

*Primary Examiner* — Joseph J Nguyen (57) ABSTRACT

A system and method for ring delay on a user agent. A destination user agent may receive a request from an origination user agent to establish a session between the two user agents. The destination user agent may delay ringing according to a ring delay parameter. If the request has not been terminated by the time the ring delay parameter is met, the destination user agent may ring and a session may occur between the origination user agent and destination user agent. If the request is terminated before the ring delay parameter is met, the destination user agent may never ring. The ring delay parameter may be a ring delay time period. The ring delay parameter may be received as part of the request from the origination user agent, set by the destination user agent, or set by a service provider for the destination user agent.

14 Claims, 9 Drawing Sheets

SYSTEM AND METHOD FOR RING DELAY ON A USER AGENT

BACKGROUND INFORMATION

Users may tend to dial certain telephone numbers unintentionally and then disconnect after a ring or two upon realizing their error. For example, certain numbers, such as 9, may be designated for some generic purpose, such as operator assistance or a helpline. But another prefix number, such as 8, may be used for external calls, for example. Rather than dialing the prefix number for an external call, a user may mistakenly dial 9, leading to the operator, and immediately disconnect upon realizing the error. This may lead to inconvenience for both the user and the unintentionally called party.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

A system and method may include various embodiments for ring delay on a user agent. In various embodiments, a user agent, such as a telephone, may delay ringing. For example, a caller may realize that he or she dialed the wrong number and immediately hang up the phone after a few rings, inconveniencing both the caller and the unintentionally called party. Delaying ringing on the called user agent may allow the caller to realize the mistake and not burden the other party with an immediate hang up.

The description below describes request receipt modules, ring delay modules, ring modules, communication modules, session modules, termination modules, user agents, service providers, service portals, computer systems, and networks that may include one or more modules, some of which are explicitly shown while others are not. As used herein, the term "module" may be understood to refer to computing software, firmware, hardware, and/or various combinations thereof. It is noted that the modules are examples. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that software described herein may be tangibly embodied in one or more physical media, such as, but not limited to, a compact disc ("CD"), a digital versatile disc ("DVD"), a floppy disk, a hard drive, read only memory ("ROM"), random access memory ("RAM"), as well as other physical media capable of storing software, and/or combinations thereof. The functions described as being performed at various components may be performed at other components, and the various components may be combined and/or separated. Other modifications also may be made.

Figure 1:
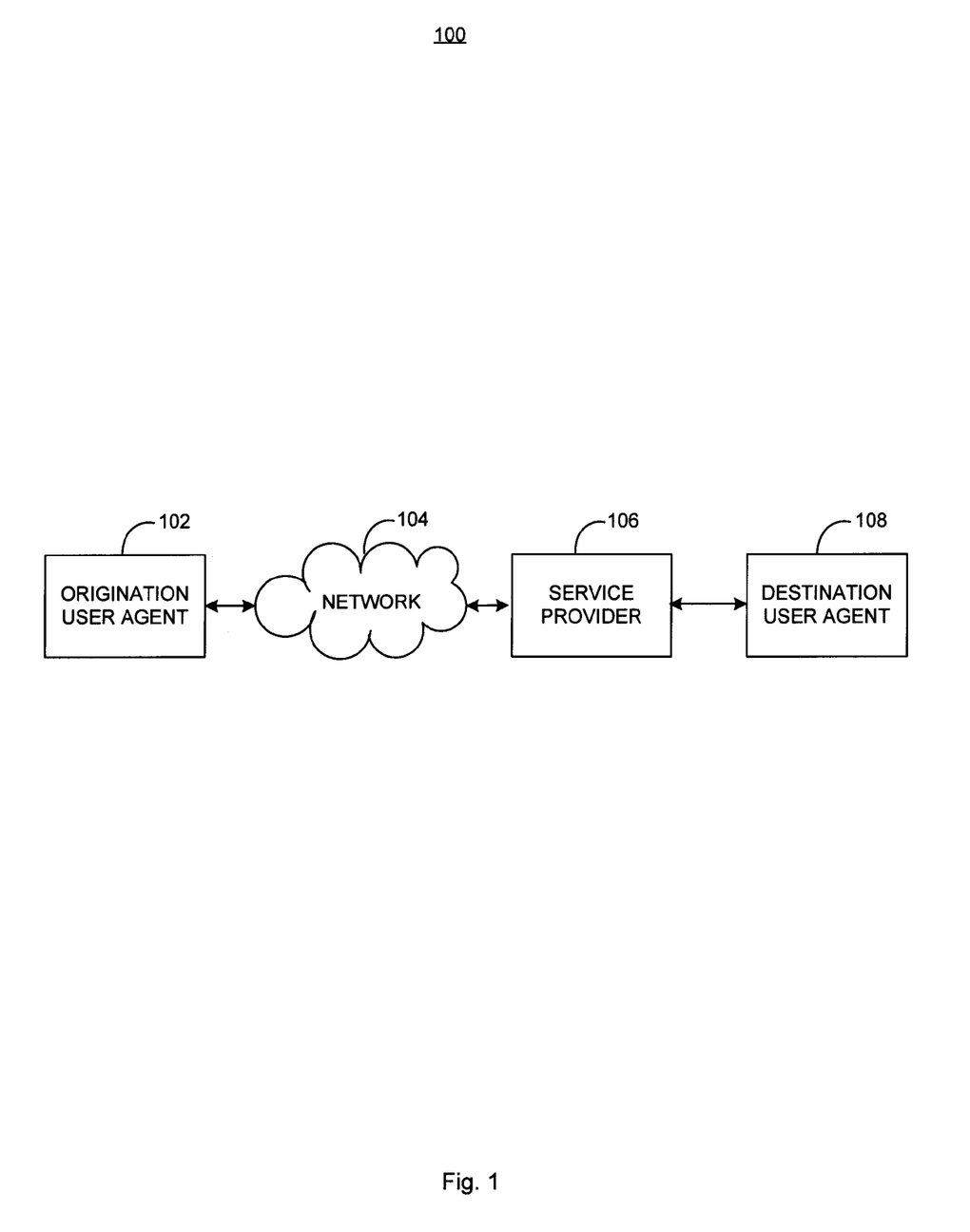
FIG. 1 is a schematic diagram illustrating a system according to a particular embodiment.

FIG. 1 is a schematic diagram illustrating a system according to a particular embodiment. A system 100 may include an origination user agent 102, a network 104, a service provider 106, and/or a destination user agent 108. Although elements of system 100 may be described as a single device, it will be appreciated that multiple instances of these devices may be included in system 100, such as, for example, multiple user agents, multiple service providers, and multiple networks. A user may be associated with origination user agent 102 and another user may be associated with destination user agent 108. The user associated with origination user agent 102, for example, may desire to make a call to the user associated with destination user agent 108.

Origination user agent 102 and/or destination user agent 108 may each be, for example, but not limited to, a cellular telephone, Session Initiation Protocol ("SIP") phone, software client/phone, a desktop computer, a laptop/notebook, a server, a module, a telephone, a satellite phone, or a communication device, such as a personal digital assistant ("PDA"), a mobile phone, a smart phone, a remote controller, a personal computer ("PC"), a workstation, a mobile device, a phone, a handheld PC, a handheld MP3 player, a handheld video player, a personal media player, a gaming device, a thin system, a fat system, a network appliance, and/or other mobile communication device that may be capable of transmitting and/or receiving data. Also, origination user agent 102 and/or destination user agent 108 may include one or more transmitters, receivers, and/or transceivers to transmit and/or receive one or more signals to and/or from other components depicted in FIG. 1, including, for example, service provider 106.

Network 104 may be a wireless network, a wired network, or any combination of wireless network and wired network. For example, network 104 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, network 104 may include, without limitation, telephone line, fiber optics, IEEE Ethernet 802.3, a wide area network ("WAN"), a local area network ("LAN"), or a global network such as the Internet. Also, network 104 may support an Internet network, a wireless communication network, a cellular network, or the like, or any combination thereof. Network 104 may further include one, or any number of the exemplary types of networks mentioned above operating as a stand-alone network or in cooperation with each other. Network 104 may utilize one or more protocols of one or more network elements to which it is communicatively coupled. Network 104 may translate to or from other protocols to one or more protocols of network devices. Although network 104 is depicted as one network, it should be appreciated that according to one or more embodiments, network 104 may comprise a plurality of interconnected networks, such as, for example, a service provider network, the Internet, a broadcaster's network, a cable television network, corporate networks, and home networks.

The components depicted in FIG. 1 may transmit and receive data to and from network 104 representing broadcast content, user request content, parallel search queries, parallel search responses, and other data. The data may be transmitted and received utilizing a standard telecommunications protocol or a standard networking protocol. For example, one embodiment may utilize Session Initiation Protocol ("SIP"). In other embodiments, the data may be transmitted and/or received utilizing other Voice Over IP ("VOIP") or messaging protocols. For example, data may also be transmitted and/or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving broadcast or parallel search data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 104 may use standard wireless protocols including IEEE 802.11a, 802.11b and 802.11g. Network 104 may also use protocols for a wired connection, such as an IEEE Ethernet 802.3.

The components depicted in FIG. 1 may also be connected to network 104, and each other, by one or more service portals (not shown), which may be, for example, but not limited to, a cellular telephone network signal tower, an Internet service provider router, a telephone adapter, a telephone router, an Ethernet router, a satellite router, a fiber optic router, a co-axial cable router, an Internet router, and/or other routing device that may provide and/or determine a transmission path for data to travel. Such service portals may also include a computer, software, and/or hardware to facilitate a routing and/or forwarding function of a signal.

Service provider 106 may include one or more devices, modules, and/or components for recording, transmitting, routing, receiving, and/or storing data over a network, such as, for example, an IP network and/or a PSTN. For example, first service provider 106 may be the cellular telephone carrier of the user associated with destination user agent 108. Service provider 106 may be responsible for a set of identifiers (e.g., telephone numbers) and may administer one or more networks. As depicted in FIG. 1, service provider 106 may administer a portion of network 104. Although service provider 106 is depicted as an individual element in FIG. 1, it should be appreciated that the contents of service provider 106 may be combined into fewer or greater numbers of devices and may be connected to additional devices not depicted in FIG. 1. Furthermore, the one or more devices may be local, remote, or a combination thereof.

Figure 2:
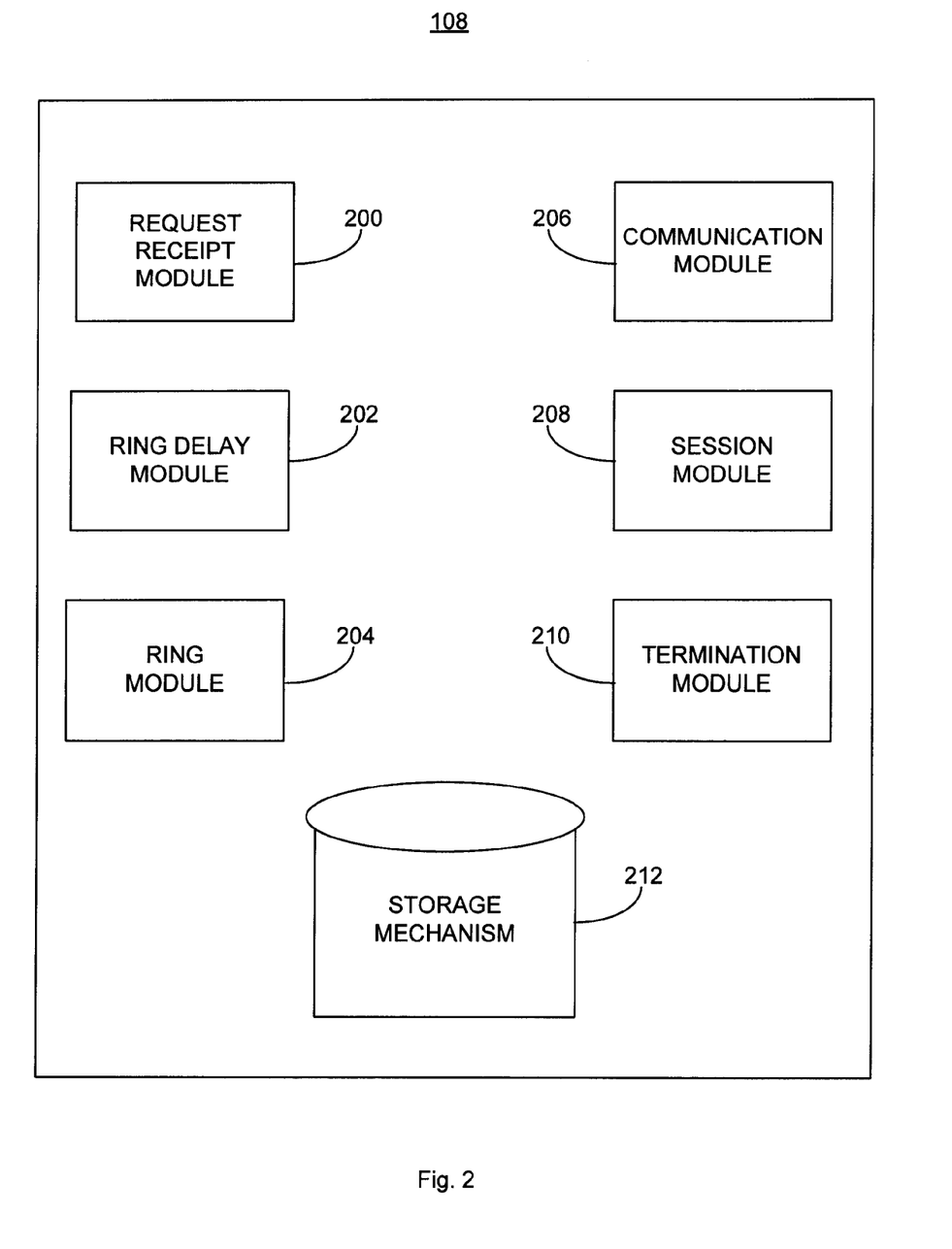
FIG. 2 is a block diagram of a destination user agent of a particular embodiment.

FIG. 2 is a block diagram of a destination user agent of a particular embodiment. For example, destination user agent 108 may include a request receipt module 200, a ring delay module 202, a ring module 204, a communication module 206, a session module 208, and a termination module 210. It is noted that modules 200, 202, 204, 206, 208, and 210 are examples and the functions performed by one or more of the modules may be combined with that performed by other modules. The functions described herein as being performed by modules 200, 202, 204, 206, 208, and 210 may also be separated and may be performed by other modules at devices local or remote to destination user agent 108. The modules may each be a computer program or an appropriately programmed computer, such as a mainframe or personal computer, or may include a plurality of such computers cooperating to perform the functionality described herein. Modules 200, 202, 204, 206, 208, and 210 may also communicate with storage mechanism 212, which may be part of destination user agent 108 or communicatively coupled to destination user agent 108. One or more of modules 200, 202, 204, 206, 208, and 210 may also be coupled to or integrated with destination user agent 108. For example, one or more of modules 200, 202, 204, 206, 208, and 210 may be part of an external device that is communicatively coupled to destination user agent 108 via an interface port which may include, without limitation, USB ports, system bus ports, or Firewire ports and other interface ports.

Figure 3:
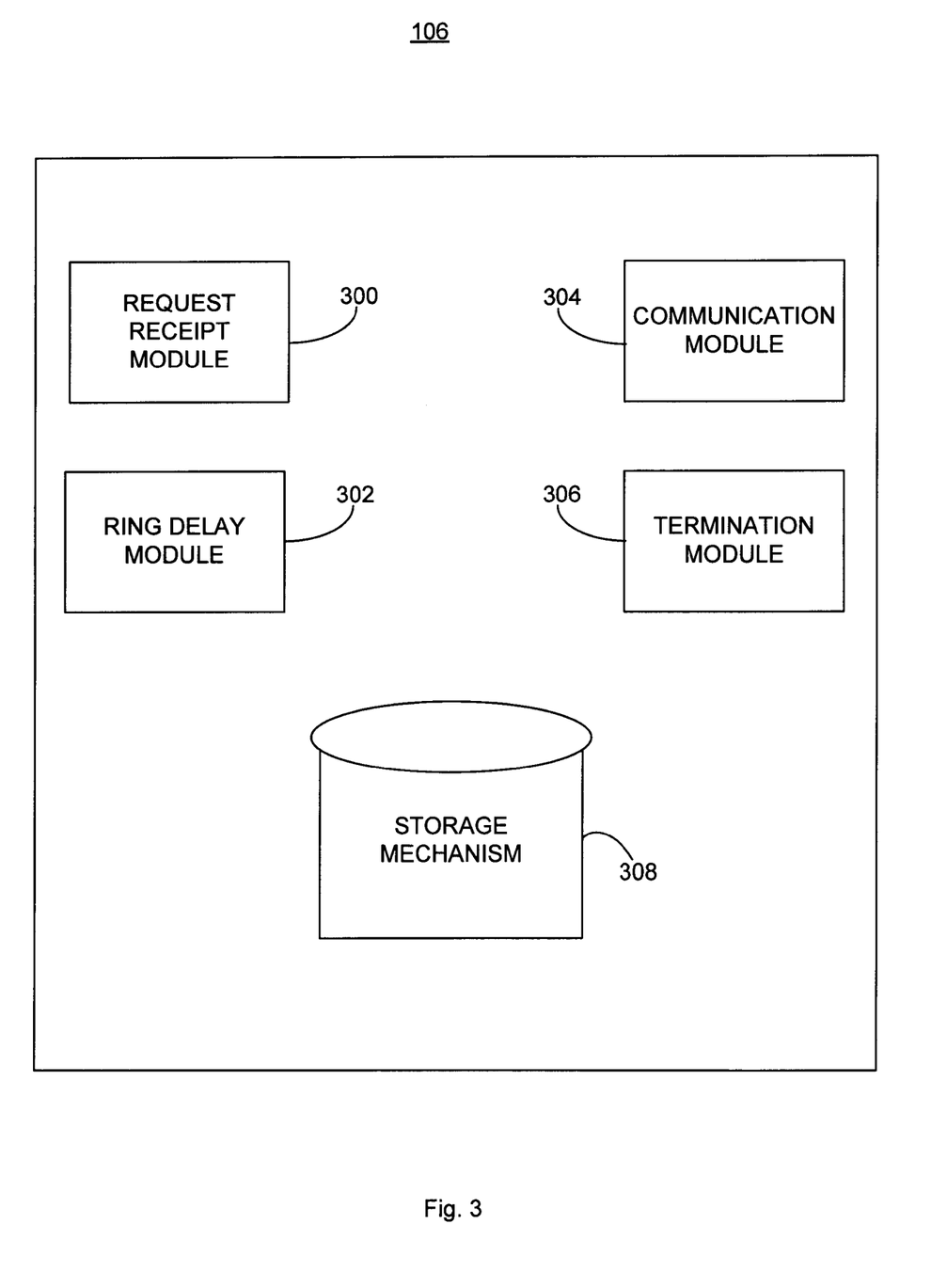
FIG. 3 is a block diagram of a service provider of a particular embodiment.

FIG. 3 is a block diagram of a service provider of a particular embodiment. For example, service provider 106 may include a request receipt module 300, a ring delay module 302, a communication module 304, and a termination module 306. It is noted that modules 300, 302, 304, and 306 are examples and the functions performed by one or more of the modules may be combined with that performed by other modules. The functions described herein as being performed by modules 300, 302, 304, and 306 may also be separated and may be performed by other modules at devices local or remote to service provider 106. The modules may each be a computer program or an appropriately programmed computer, such as a mainframe or personal computer, or may include a plurality of such computers cooperating to perform the functionality described herein. Modules 300, 302, 304, and 306 may also communicate with storage mechanism 308, which may be part of service provider 106 or communicatively coupled to service provider 106. One or more of 300, 302, 304, and 306 may also be coupled to or integrated with service provider 106. For example, one or more of modules 300, 302, 304, and 306 may be part of an external device that is communicatively coupled to service provider 106 via an interface port which may include, without limitation, USB ports, system bus ports, or Firewire ports and other interface ports.

Figure 4:
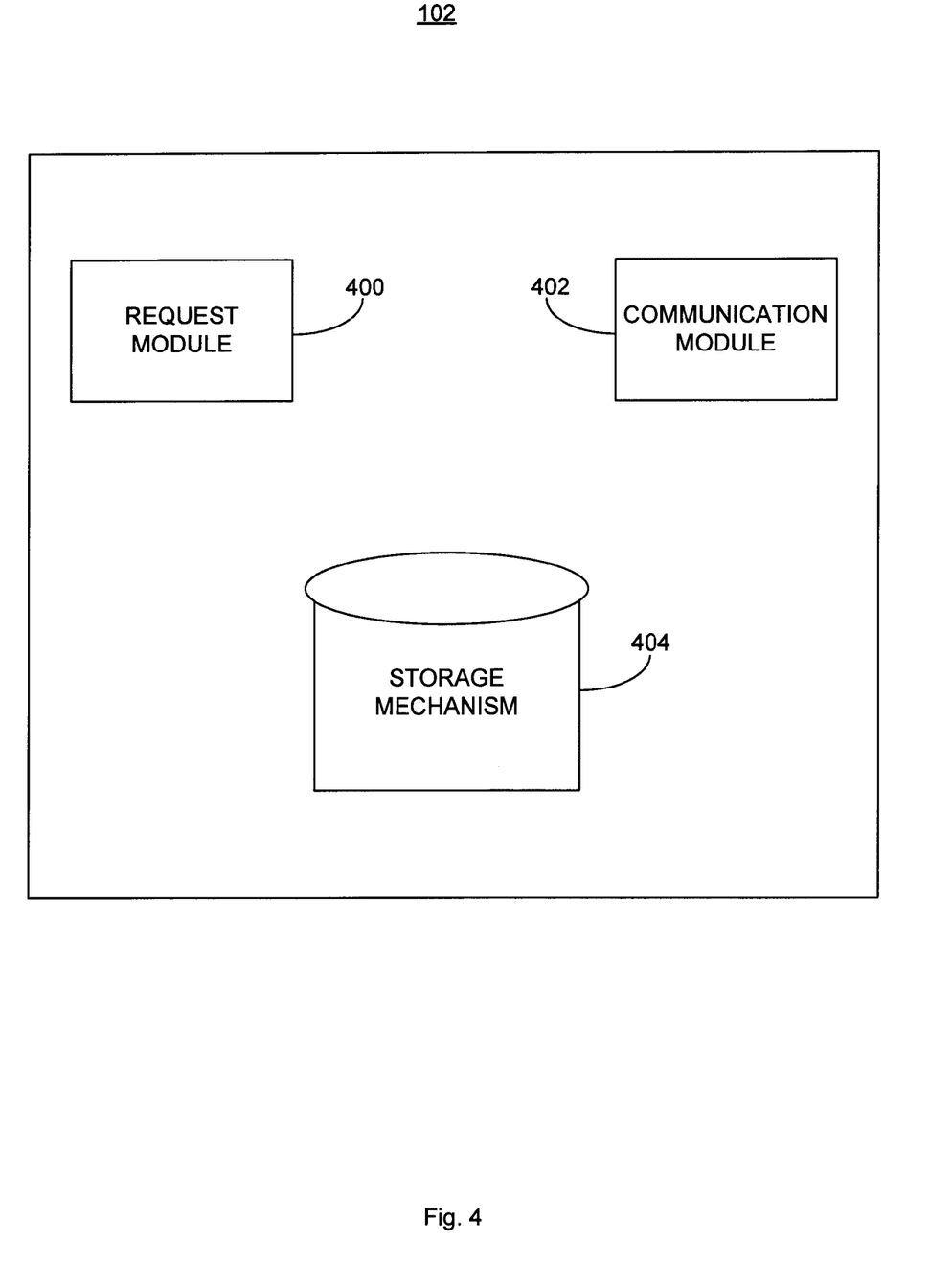
FIG. 4 is a block diagram of an origination user agent of a particular embodiment.

FIG. 4 is a block diagram of an origination user agent of a particular embodiment. For example, origination user agent 102 may include a request module 400 and a communication module 402. It is noted that modules 400 and 402 are examples and the functions performed by one or more of the modules may be combined with that performed by other modules. The functions described herein as being performed by modules 400 and 402 may also be separated and may be performed by other modules at devices local or remote to origination user agent 102. The modules may each be a computer program or an appropriately programmed computer, such as a mainframe or personal computer, or may include a plurality of such computers cooperating to perform the functionality described herein. Modules 400 and 402 may also communicate with storage mechanism 404, which may be part of origination user agent 102 or communicatively coupled to origination user agent 102. One or more of 400 and 402 may also be coupled to or integrated with origination user agent 102. For example, one or more of modules 400 and 402 may be part of an external device that is communicatively coupled to origination user agent 102 via an interface port which may include, without limitation, USB ports, system bus ports, or Firewire ports and other interface ports.

Figure 5:
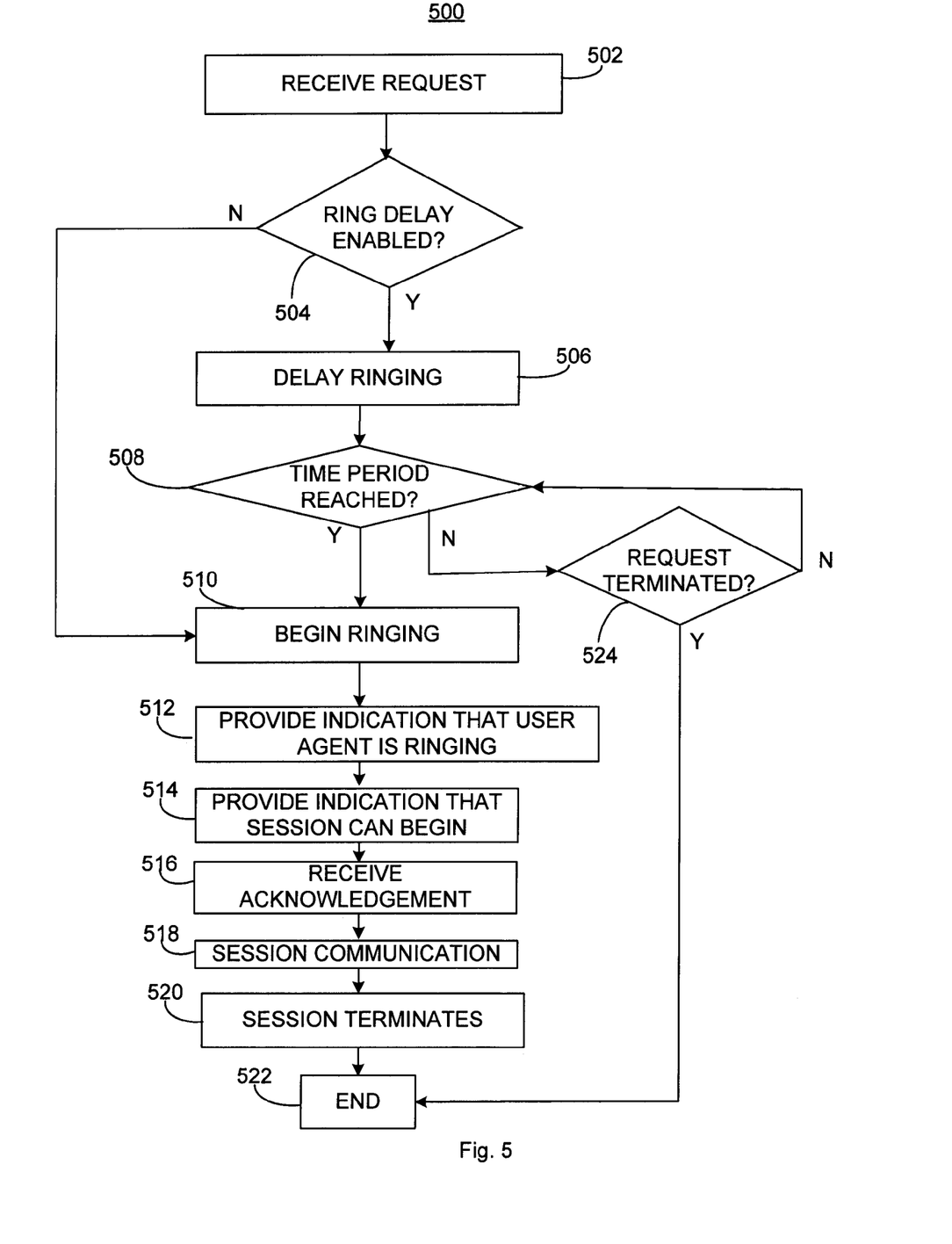
FIG. 5 is a flowchart illustrating the functionality of a destination user agent in a particular embodiment.

FIG. 5 is a flowchart illustrating the functionality of a destination user agent in a particular embodiment. This method is provided by way of example, as there are a variety of ways to carry out the methods described herein. Method 500 shown in FIG. 5 may be executed or otherwise performed by one or a combination of various systems. The method 500 may be carried out through system 100 of FIG. 1, for example, and various elements of FIG. 1 and FIGS. 3-5 are referenced in explaining method 500 of FIG. 5. Also, although method 500 is described with reference to a destination user agent, method 500 may be carried out by any other device or system as well. Each block shown in FIG. 5 represents one or more processes, methods, or subroutines carried out in method 500. Method 500 may begin at block 502.

At block 502, request receipt module 200 of destination user agent 108 may receive a request to establish a session (e.g., a call) between origination user agent 102 and destination user agent 108. For example, a user operating origination user agent 102 may dial a particular telephone number, which may cause a request to be submitted through various service portals and/or network 104 to service provider 106. Service provider 106 may then route the request to destination user agent 108, which receives the request. In various embodiments, the request may comprise a ring delay parameter, which may instruct destination user agent 108 to delay the ringing of destination user agent 108 in some manner. For example, the ring delay parameter may comprise a ring delay time period in which to delay ringing (e.g., five seconds), or a number of rings to delay ringing (e.g., start a ringtone only after the second ring). In that way, unintentional calls may be avoided where the user dialing destination user agent 108 realizes he or she dialed an incorrect number and hangs up before destination user agent 108 rings. The ring delay parameter may also comprise a number of calls before the phone should ring (e.g., ring only on the second consecutive call received from the dialing number because the called party is in a meeting). Destination user agent 108 may then only ring when the dialing user is trying to reach the user operating destination user agent 108 very urgently.

The ring delay parameter may be part of the request to establish the session. For example, the request may comprise a SIP INVITE message with a private header comprising the ring delay parameter. An example INVITE message with a "P-Ring-Delay" header instructing destination user agent 108 to delay ringing by five seconds is shown below:

INVITE sip:user1@domain1.com SIP/2.0
 Via: SIP/2.0/TCP client.example.com:5060; branch=1234567890
 Max-Forwards: 70
 From: User1 <sip:user1@domain1.com>; tag=1234567890
 To: User2 <sip:user2@domain2.com>
 Call-ID: 1234567890@example.com
 CSeq: 1 INVITE
 Contact: <sip:user1@domain1.com;transport=tcp>
 Content-Type: application/sdp
 Content-Length: 62
 P-Ring-Delay: 5 s Destination user agent 108 may be programmed or configured to recognize the "P-Ring-Delay" header and operate accordingly (e.g., by delaying ringing for five seconds). If destination user agent 108 is not programmed or configured to recognize the header, it may ignore the header and ring normally. Also, service provider 106 itself may handle a ring delay request. Also, destination user agent 108 or service provider 106 may be set to ignore any incoming ring delay header (e.g., via a user input to a telephone button, keyboard, or mouse connected to destination user agent 108, or via a request from destination user 108 or a phone system administrator to service provider 106).

Also, the ring delay parameter may be set by destination user agent 108. For example, destination user agent 108 may be set (e.g., via a user input to a telephone button, keyboard, or mouse connected to destination user agent 108) to delay ringing all incoming calls for five seconds. Or, destination user agent 108 may be set to delay ringing when an incoming call is from a particular user agent (e.g., from the phone number assigned to origination user agent 102). Or, destination user agent 108 may be set to delay ringing whenever an incoming call is from a user agent that is not recognized. For example, destination user agent 108 may store a list of contacts in storage mechanism 212 with phone numbers for all of the user's contacts. Destination user agent 108 may be set to delay ringing when the phone number of an incoming call is not in the list. Or, destination user agent 108 may be set to only ring on a second consecutive incoming call from a particular user agent (e.g., origination user agent 102). Or, destination user agent 108 may be set to delay ringing for all incoming calls. Or, ring delay may be turned off such that there will not be any delay of ringing for any incoming call. Or, destination user agent 108 may be set to override any request and delay ringing according to its own setting(s). Destination user agent 108 may be fully customizable by a user operating destination user agent 108, who may input commands to destination user agent 108 to delay ringing for certain user-specified sessions (e.g., via a user input to a telephone button, keyboard, or mouse).

At block 504, ring delay module 202 of destination user agent 108 may determine whether ring delay is enabled for the requested session (e.g., whether a user setting for ring delay has been enabled for incoming calls). For example, destination user agent 108 may be set to ignore incoming ring delay headers, or destination user agent 108 may not be programmed or configured to recognize a ring delay header. If ring delay is not enabled, ring module 204 may begin ringing destination user agent 508 normally at block 510.

If ring delay is enabled, however, at block 506, ring delay module 202 of destination user agent 108 may delay ringing at destination user agent 108 according to the ring delay parameter. For example, destination user agent 108 may be set to ring with a certain ringtone whenever it receives an incoming call, and ring delay module 202 may delay that ring for a certain period of time (e.g., five seconds). Destination user agent 108 may wait to begin the ring until the ring delay time period is reached (e.g., until five seconds have elapsed).

During the time destination user agent 108 is waiting to begin ringing, ring delay module 202 may provide any type of indication to any component indicating the status of destination user agent 108. For example, ring delay module 202 may provide a message to service provider 106 and/or network 104. Or, ring delay module 202 may provide a message (e.g., electronic signal, text message) to origination user agent 102 indicating that ringing on destination user agent 108 is being delayed.

At block 508, destination user agent 108 may determine if the ring delay time period has been reached (or if the ring delay parameter has otherwise been satisfied). If not, destination user agent 108 determines at block 524 if the request was terminated (e.g., by origination user agent 102). For example, a user operating origination user agent 102 may hang up his or her phone, causing an indication (e.g., a SIP BYE message) to be provided from origination user agent 102 through network 104 and service provider 106 to destination user agent 108. If so, the method ends at block 522. If the request has not been terminated, however, destination user agent 108 returns to block 508 and waits until the time period is reached (or the ring delay parameter is otherwise satisfied). In that way, if a call is disconnected before the ring delay time period is reached, destination user agent 108 never rings and does not provide any indication to origination user agent 102 that it is ringing.

At block 510, once the ring delay time period is reached (or the ring delay parameter is otherwise satisfied), ring module 204 may begin ringing destination user agent 108. For example, ring module 204 may initiate an audible ringtone, phone vibration, screen display, or any other type of indication to alter the operating user that a session is being requested.

At block 512, communication module 206 of destination user agent 108 may provide an indication that destination user agent 108 is ringing. For example, communication module 206 may provide a SIP RINGING message through service provider 106 and network 104 to origination user agent 102. In that way, origination user agent 102 may know that destination user agent 108 is ringing, and may initiate an audible ringtone on origination user agent 102. But because the ring was delayed, the user operating origination user agent 102 may have had time to determine whether he or she made a mistake (e.g., mistakenly dialed 9 for the operator) and hang up if necessary.

At block 514, communication module 206 of destination user agent 108 may provide an indication that the session is to begin (e.g., a user associated with destination user agent 108 answered the call). For example, communication module 206 may provide a SIP OK message.

At block 516, communication module 206 of destination user agent 108 may receive an acknowledgement from origination user agent 102 that the session can begin. For example, origination user agent 102 may provide a SIP ACK message through network 104 and service provider 106 to destination user agent 108.

At block 518, session module 208 of destination user agent 108 may transfer data back and forth during the session (e.g., a SIP session between two phones). At block 520, termination module 210 of destination user agent 108 may terminate the session (e.g., when one of the users operating origination user agent 102 and destination user agent 108 hang up). At block 522, the method may end, and destination user agent 108 may wait for the next incoming or outgoing call.

Figure 6:
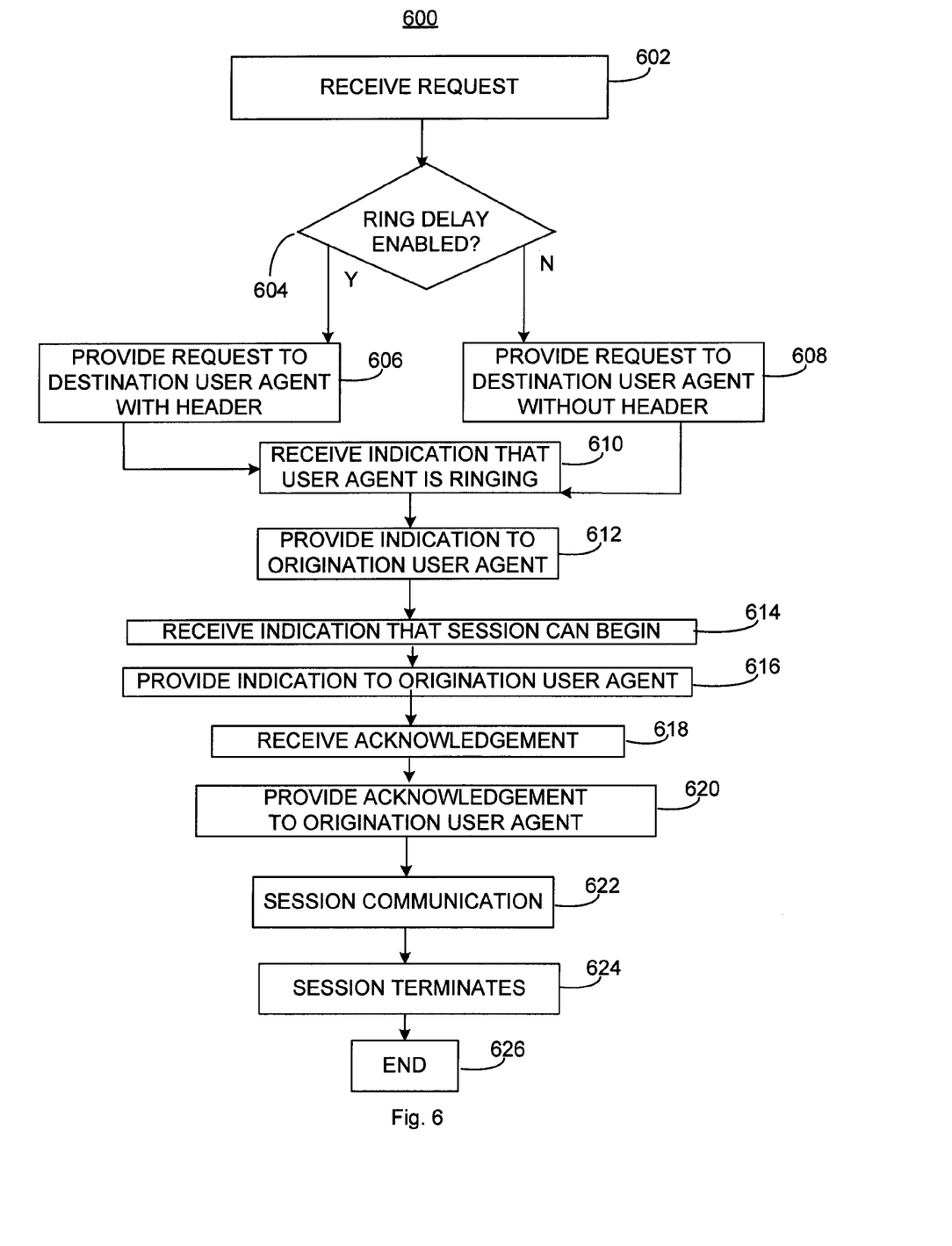
FIG. 6 is a flowchart illustrating the functionality of a service provider in a particular embodiment.

FIG. 6 is a flowchart illustrating the functionality of a service provider in a particular embodiment. This method is provided by way of example, as there are a variety of ways to carry out the methods described herein. Method 600 shown in FIG. 6 may be executed or otherwise performed by one or a combination of various systems. The method 600 may be carried out through system 100 of FIG. 1, for example, and various elements of FIG. 1 and FIGS. 3-5 are referenced in explaining method 600 of FIG. 6. Also, although method 600 is described with reference to a service provider, method 600 may be carried out by any other device or system as well. Each block shown in FIG. 6 represents one or more processes, methods, or subroutines carried out in method 600. Method 600 may begin at block 602.

At block 602, request receipt module 300 of service provider 106 may receive a request to establish a session (e.g., a call) between origination user agent 102 and destination user agent 108. For example, a user operating origination user agent 102 may dial a particular telephone number, which may cause a request to be submitted through various service portals and/or network 104 to service provider 106. The request may comprise a ring delay parameter, as described herein. Or, the ring delay parameter may be set by service provider 106 (e.g., upon receiving a request from destination user agent 108 or a phone system administrator) so that requests to establish a session with destination user agent 108 have their ringing delayed.

At block 604, service provider 106 may determine whether ring delay is enabled for the requested session (e.g., whether a user setting for ring delay has been enabled for incoming calls). For example, service provider 106 may be set to ignore ring delay headers for destination user agent 108, or may be set to add a ring delay header for destination user agent 108.

If ring delay is enabled, at block 606, communication module 304 of service provider 106 may provide the request to establish a session (e.g., a call) to destination user agent 108 with a ring delay header.

If ring delay is not enabled, at block 608, communication module 304 of service provider 106 may provide the request to establish a session (e.g., a call) to destination user agent 108 without a ring delay header.

At block 610, communication module 304 of service provider 106 may receive an indication from destination user agent 108 that destination user agent 108 is ringing (e.g., after a delay as specified by the ring delay header). For example, communication module 304 may receive a SIP RINGING message.

At block 612, communication module 304 of service provider 106 may provide an indication to origination user agent 102 (e.g., over network 104) that destination user agent 108 is ringing.

At block 614, communication module 304 of service provider 106 may receive an indication that the session is to begin (e.g., a user associated with destination user agent 108 answered the call). For example, communication module 304 may receive a SIP OK message.

At block 616, communication module 304 of service provider 106 may provide the indication that the session is to begin to origination user agent 102.

At block 618, communication module 304 of service provider 106 may receive an acknowledgement from origination user agent 102 (e.g., over network 104) that the session can begin. For example, communication module 304 may receive a SIP ACK message.

At block 620, communication module 304 of service provider 106 may provide an acknowledgement to destination user agent 108.

At block 622, communication module 304 of service provider 106 may facilitate session communication between origination user agent 102 and destination user agent 108. For example, communication module 304 may route voice data from one user agent to the other, and vice versa.

At block 624, termination module 306 of service provider 106 may receive an indication that the session is to be terminated, and may terminate the session between origination user agent 102 and destination user agent 108. For example, termination module 306 may receive a SIP BYE message from origination user agent 102 (e.g., by a user operating origination user agent 102 hung up), and may terminate the call by notifying destination user agent 108 that the user operating origination user agent 102 hung up. At block 626, the method may end, and service provider 106 may wait for the next incoming or outgoing call.

Figure 7:
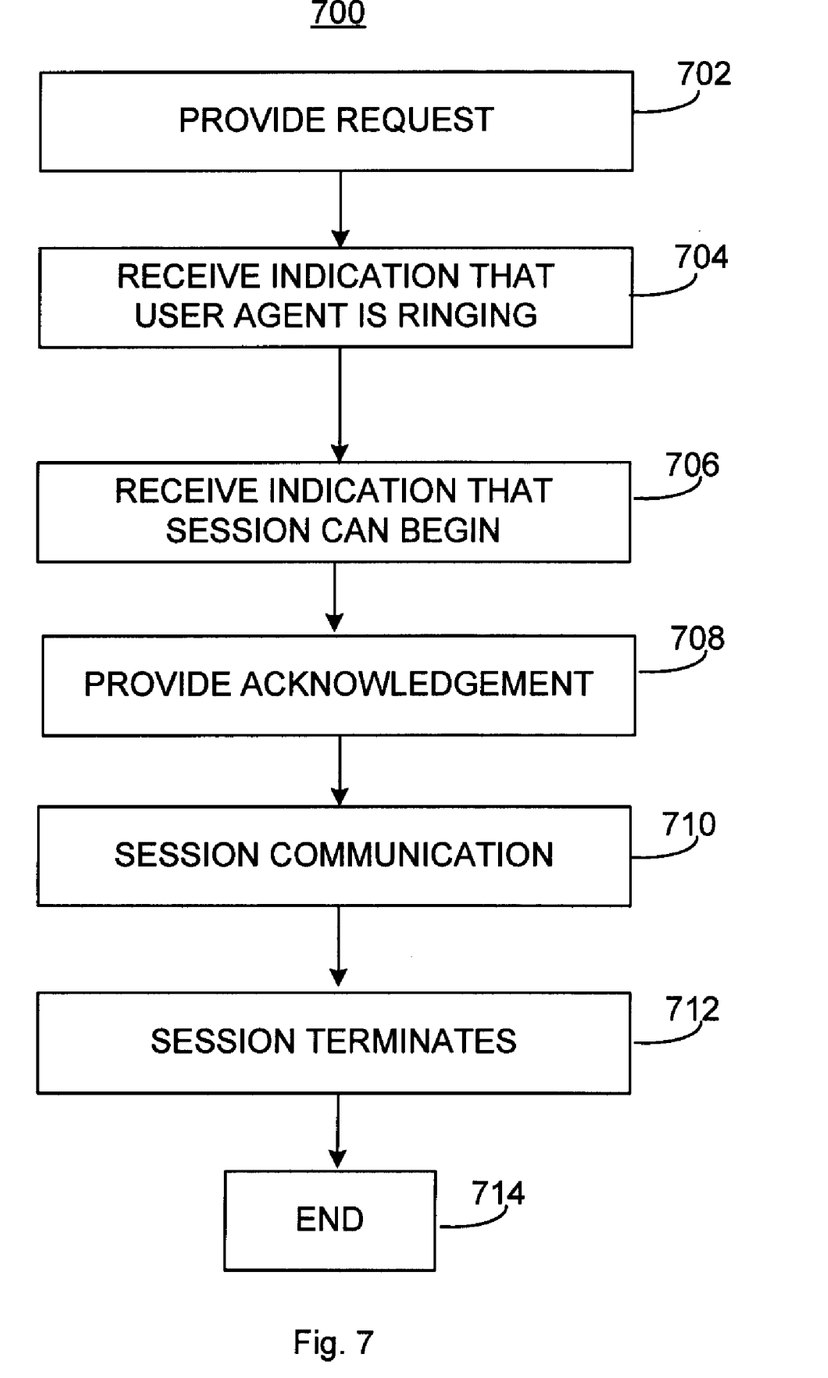
FIG. 7 is a flowchart illustrating the functionality of an origination user agent in a particular embodiment.

FIG. 7 is a flowchart illustrating the functionality of an origination user agent in a particular embodiment. This method is provided by way of example, as there are a variety of ways to carry out the methods described herein. Method 700 shown in FIG. 7 may be executed or otherwise performed by one or a combination of various systems. The method 700 may be carried out through system 100 of FIG. 1, for example, and various elements of FIG. 1 and FIGS. 3-5 are referenced in explaining method 700 of FIG. 7. Also, although method 700 is described with reference to a service provider, method 700 may be carried out by any other device or system as well. Each block shown in FIG. 7 represents one or more processes, methods, or subroutines carried out in method 700. Method 700 may begin at block 702.

At block 702, request module 400 of origination user agent 102 may provide a request to establish a session (e.g., a call) between origination user agent 102 and destination user agent 108. For example, a user operating origination user agent 102 may dial a particular telephone number, which may cause the request to be submitted through various service portals and/or network 104 to destination user agent 108. The request may comprise a ring delay parameter, as described herein.

At block 704, communication module 402 of origination user agent 102 may receive an indication from destination user agent 108 that destination user agent 108 is ringing. For example, communication module 402 may receive a SIP RINGING message.

At block 706, communication module 402 of origination user agent 102 may receive an indication that the session is to begin (e.g., a user associated with destination user agent 108 answered the call). For example, communication module 402 may receive a SIP OK message.

At block 708, communication module 402 of origination user agent 102 may provide an acknowledgement (e.g., over network 104) that origination user agent 102 received the indication and/or is waiting for the session to be established. For example, communication module 402 may provide a SIP ACK message.

At block 710, communication module 402 of origination user agent 102 may transfer data back and forth during the session. At block 712, the session may terminate (e.g., when one of the users operating origination user agent 102 and destination user agent 108 hang up). At block 714, the method may end, and origination user agent 102 may wait for the next incoming or outgoing call.

Figure 8:
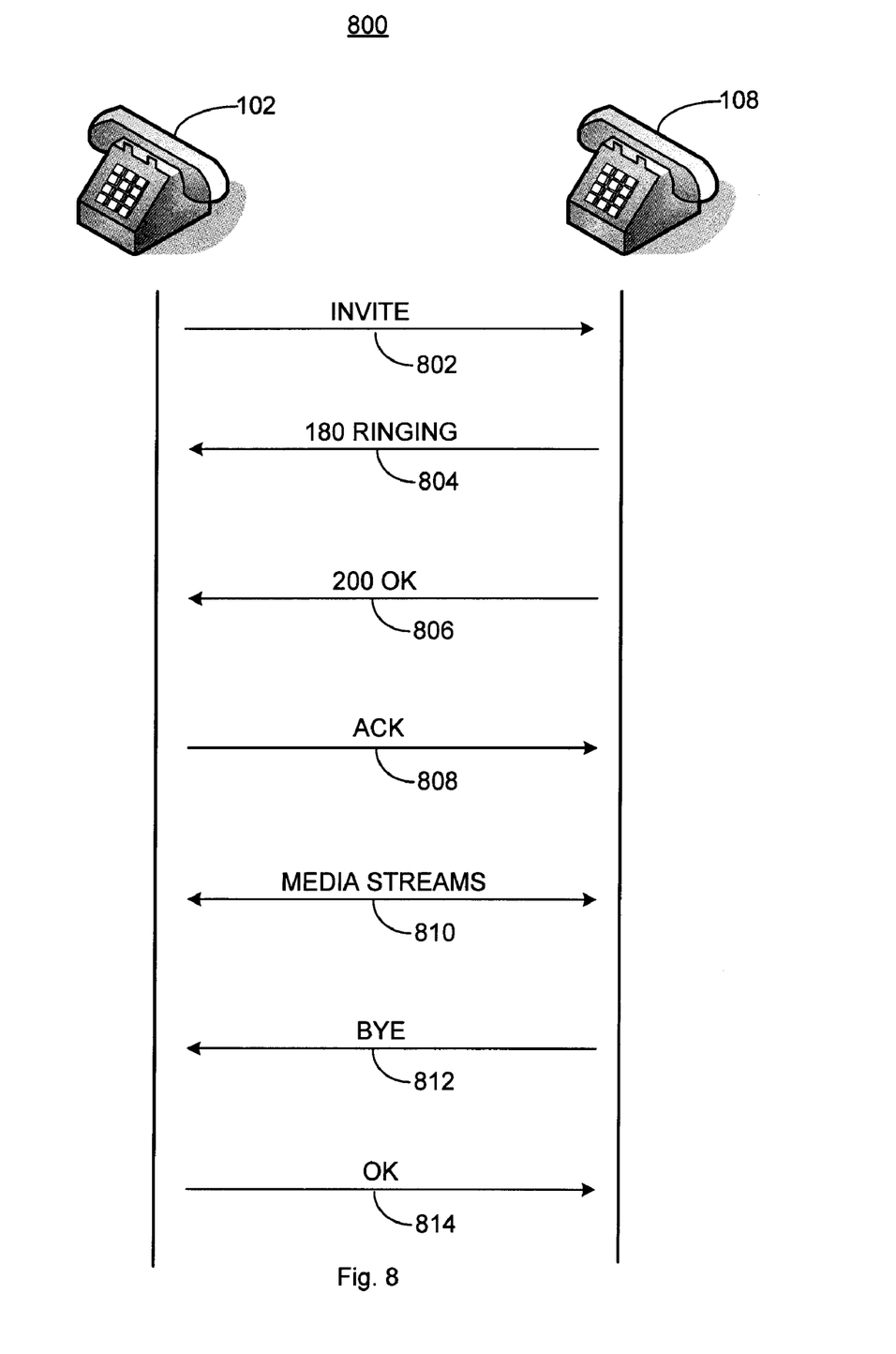
FIG. 8 is a sequence diagram illustrating the functionality of a particular embodiment where a request is not terminated prior to ringing.

FIG. 8 is a sequence diagram illustrating the functionality of a particular embodiment where a request is not terminated prior to ringing. This sequence is provided by way of example, as there are a variety of ways to carry out the methods described herein. Sequence 800 shown in FIG. 8 may be executed or otherwise performed by one or a combination of various systems. The sequence 800 may be carried out through system 100 of FIG. 1, for example, and various elements of FIG. 1 and FIGS. 3-5 are referenced in explaining method 800 of FIG. 8. Also, although sequence 800 is described with reference to origination user agent 102 and destination user agent 108 communicating via SIP, sequence 800 may occur using any other device or system as well. Each line shown in FIG. 8 represents one or more communications between origination user agent 102 and destination user agent 108.

At line 802, origination user agent 102 may provide a SIP INVITE message to destination user agent 108. For example, a user operating origination user agent 102 may desire to make a phone call to a user operating destination user agent 108.

Destination user agent 108 may then delay ringing according to a ring delay parameter (e.g., a header with the ring delay parameter received as part of the INVITE message). Once destination user agent 108 begins ringing, at line 804, destination user agent 108 may provide a SIP RINGING message to origination user agent 102 indicating that destination user agent 108 is ringing.

At line 806, destination user agent 108 may provide a SIP OK message to origination user agent 102.

At line 808, origination user agent 102 may provide a SIP ACK message to destination user agent 108.

At line 810, media streams may flow between origination user agent 102 and destination user agent 108 during the session.

At line 812, destination user agent 108 may provide a SIP BYE message to origination user agent 102 (e.g., when a user operating destination user agent 108 hangs up).

At line 814, origination user agent 102 may provide a SIP OK message to destination user agent 108.

Figure 9:
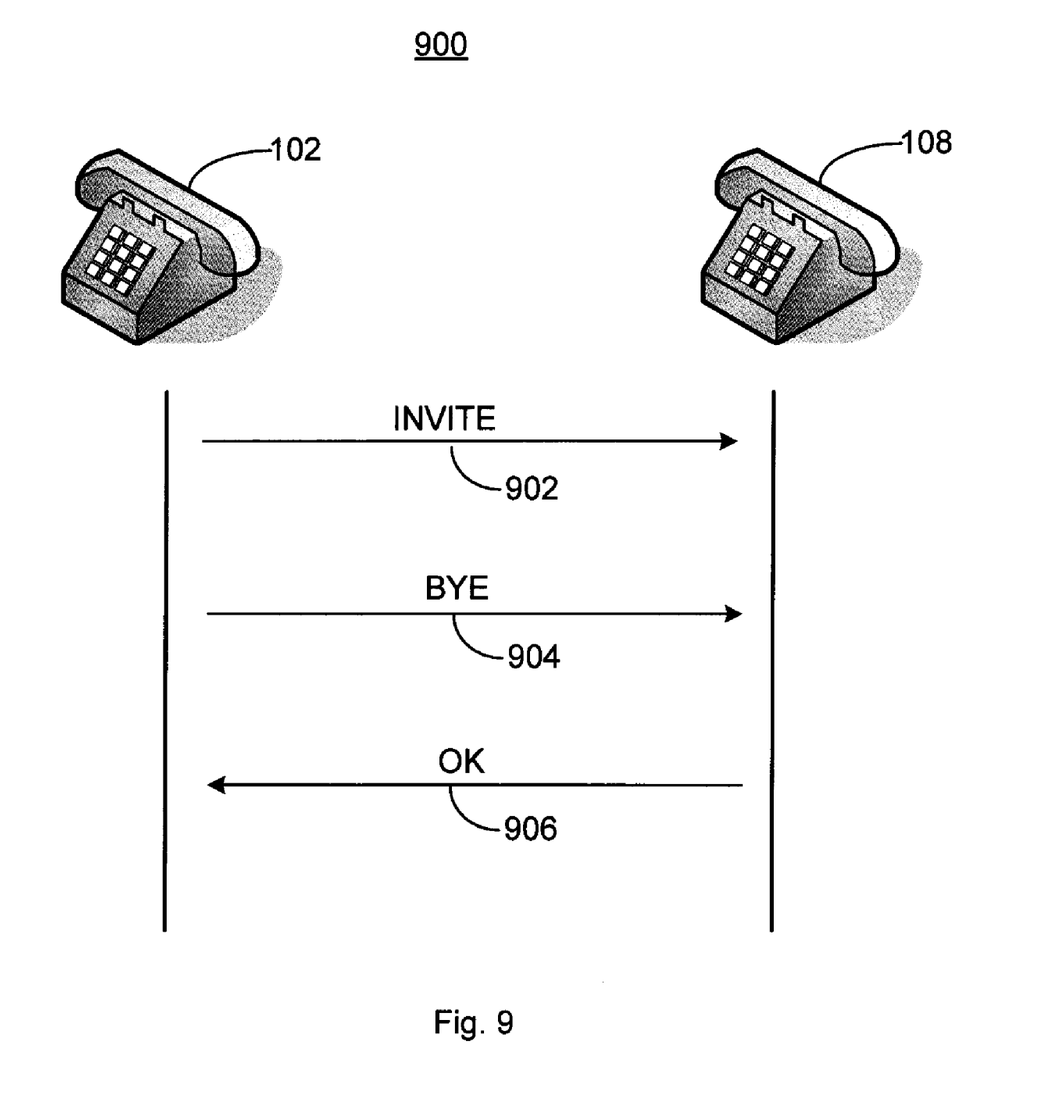
FIG. 9 is a sequence diagram illustrating the functionality of a particular embodiment where a request is terminated before ringing.

FIG. 9 is a sequence diagram illustrating the functionality of a particular embodiment where a request is terminated prior to ringing. This sequence is provided by way of example, as there are a variety of ways to carry out the methods described herein. Sequence 900 shown in FIG. 9 may be executed or otherwise performed by one or a combination of various systems. The sequence 900 may be carried out through system 100 of FIG. 1, for example, and various elements of FIG. 1 and FIGS. 3-5 are referenced in explaining method 900 of FIG. 9. Also, although sequence 900 is described with reference to origination user agent 102 and destination user agent 108 communicating via SIP, sequence 900 may occur using any other device or system as well. Each line shown in FIG. 9 represents one or more communications between origination user agent 102 and destination user agent 108.

At line 902, origination user agent 102 may provide a SIP INVITE message to destination user agent 108. For example, a user operating origination user agent 102 may desire to make a phone call to a user operating destination user agent 108.

Destination user agent 108 may then delay ringing according to a ring delay parameter (e.g., a header with the ring delay parameter received as part of the INVITE message). Before destination user agent 108 begins ringing, however, origination user agent 102 may terminate the request. For example, a user operating origination user agent 102 may hang up after realizing that he or she dialed the wrong number. At line 904, origination user agent 102 may provide a SIP BYE message to destination user agent 108.

At line 906, destination user agent 108 may provide a SIP OK message to origination user agent 102.

It is noted that any of the systems and methods described with reference to FIGS. 1-9 may also be performed in reverse (e.g., where destination user agent 108 initiates a call to origination user agent 102).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A computer-implemented method, comprising:
receiving a request, comprising a Session Initiation Protocol (SIP) invite message having a header, to establish a session between an origination user agent and a destination user agent;
using one or more processors, delaying ringing at the destination user agent according to a ring delay parameter that is contained in the header of the request,
wherein the ring delay parameter comprises a ring delay time period;
ringing the destination user agent once the ring delay time period is reached;
providing an indication to the origination user agent that the destination user agent is ringing;
providing an indication to the origination user agent that the session can begin, and
establishing the session; and
terminating the request to establish the session upon receiving an indication that the origination user agent terminated the request before the ring delay time period was reached.

2. The method of claim 1, wherein the ring delay parameter is set by the destination user agent.

3. The method of claim 1, wherein the ring delay parameter is set by a service provider for the destination user agent.

4. The method of claim 1, wherein the ring delay parameter comprises an instruction to delay ringing for requests from any user agent.

5. The method of claim 1, wherein the ring delay parameter comprises an instruction to delay ringing for requests from any user agent not in a contact list of the destination user agent.

6. A non-transitory computer readable medium comprising computer executable code to perform the following steps:
receiving a request, comprising a Session Initiation Protocol (SIP) invite message having a header, to establish a session between an origination user agent and a destination user agent;
using one or more processors, delaying ringing at the destination user agent according to a ring delay parameter that is contained in the header of the request;
wherein the ring delay parameter comprises a ring delay time period;
ringing the destination user agent once the ring delay time period is reached;
providing an indication to the origination user agent that the destination user agent is ringing;
providing an indication to the origination user agent that the session can begin;
establishing the session; and
terminating the request to establish the session upon receiving an indication that the origination user agent terminated the request before the ring delay time period was reached.

7. The non-transitory computer readable medium of claim 6, wherein the ring delay parameter is set by the destination user agent.

8. The non-transitory computer readable medium of claim 6, wherein the ring delay parameter is set by a service provider for the destination user agent.

9. The non-transitory computer readable medium of claim 6, wherein the ring delay parameter comprises an instruction to delay ringing for requests from any user agent.

10. The non-transitory computer readable medium of claim 6, wherein the ring delay parameter comprises an instruction to delay ringing for requests from any user agent not in a contact list of the destination user agent.

11. A computer-based system, comprising:
a request receipt module that receives a request, comprising a Session Initiation Protocol (SIP) invite message with a header, to establish a session between an origination user agent and a destination user agent; and
a ring delay module that delays ringing at the destination user agent according to a ring delay parameter that is contained in the header,
wherein the ring delay parameter comprises a ring delay time period;
a ring module that rings the destination user agent once the ring delay time period is reached;
a communication module that provides an indication to the origination user agent that the destination user agent is ringing and provides an indication to the origination user agent that the session can begin; and
a session module that establishes the session; and
a termination module that receives an indication that the origination user agent terminated the request before the ring delay time period was reached.

12. The system of claim 11, wherein the ring delay parameter is set by the destination user agent.

13. The system of claim 11, wherein the ring delay parameter is set by a service provider for the destination user agent.

14. The system of claim 11, wherein the ring delay parameter comprises an instruction to delay ringing for requests from any user agent.

* * * * *